United States Patent Office 3,526,438
Patented Sept. 1, 1970

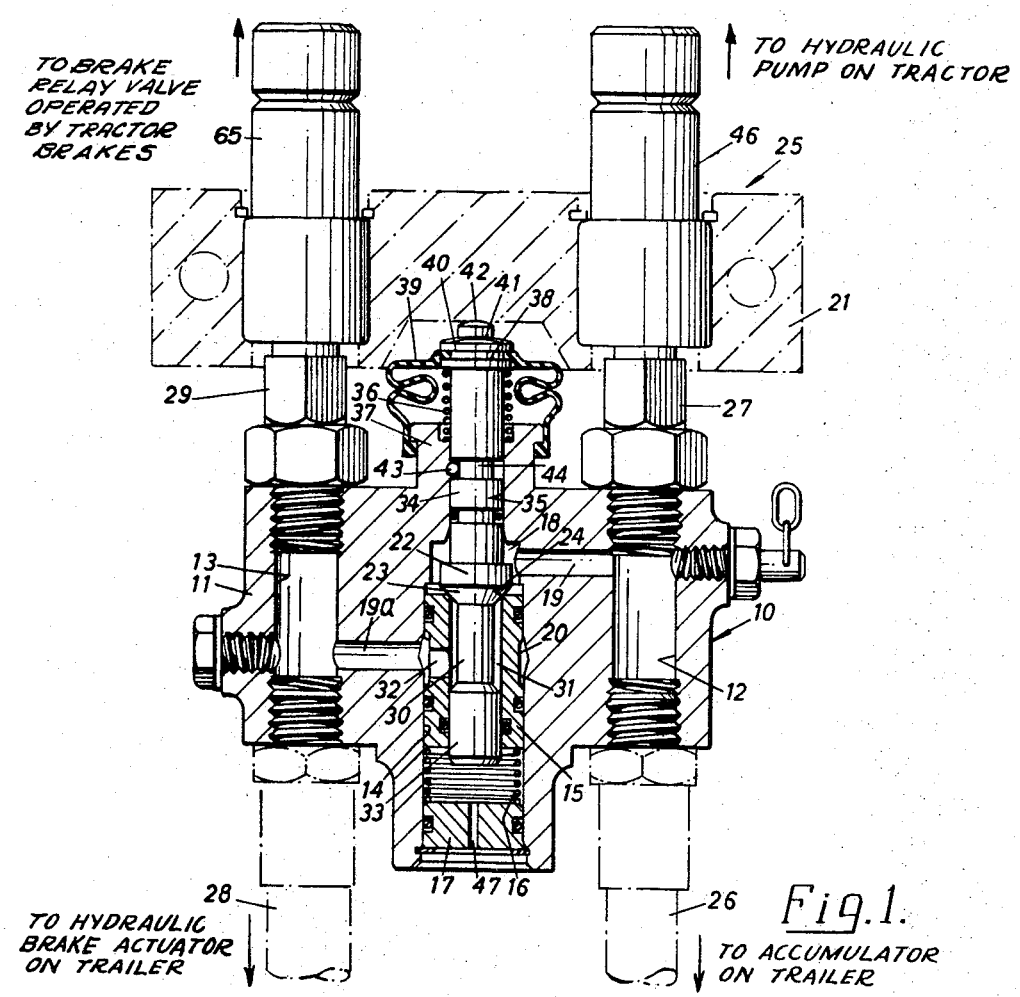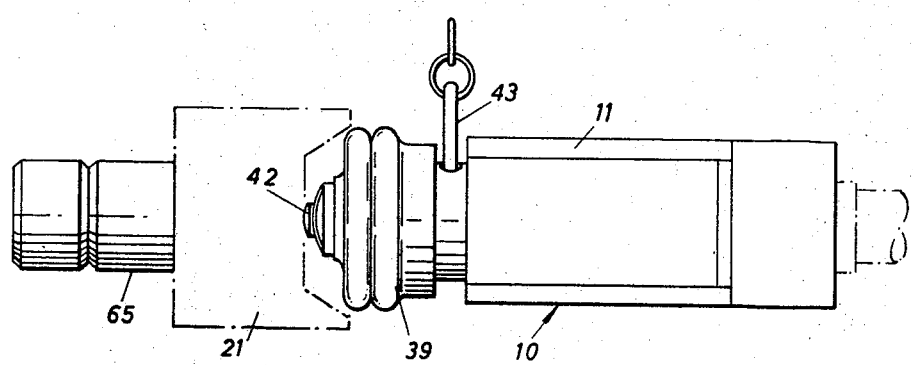

3,526,438
COUPLINGS FOR BRAKE SYSTEM
Michael J. England, Sutton, Derrick Donnell, Coventry, and Eric C. Hales, Studley, England, assignors to Girling Limited, Birmingham, England
Filed Jan. 29, 1969, Ser. No. 795,085
Claims priority, application Great Britain, Feb. 1, 1968, 5,210/68; July 18, 1968, 34,148/68
Int. Cl. B60t 17/04, 17/18
U.S. Cl. 303—18    17 Claims

ABSTRACT OF THE DISCLOSURE

A twin-line self-sealing hydraulic coupling for a trailer brake system, in which an accumulator and hydraulic brakes are fitted to the trailer, is fitted with a safety device for hydraulically operating the brakes in the event of trailer breakaway. The safety device comprises a valve on the trailer for automatically interconnecting the accumulator and brake lines immediately the coupling heads are separated from one another.

---

The present invention relates to couplings for trailer brake systems and more particularly to a safety device for fitment to a trailer vehicle for automatically applying the trailer brakes in the event that the trailer breaks away from the tractor vehicle.

The safety device of the invention is employed in a "twin-line" trailer brake system in which a first line serves for supplying fluid under pressure to a reservoir or accumulator fitted to the trailer and a second line serves for actuating the trailer brakes, each line incorporating a coupling with a self-closing valve whereby at least that part of the line on the trailer vehicle is automatically closed by a valve when the coupling is uncoupled.

According to the present invention, a safety device for a twin-line trailer brake system having coupling heads with self-closing valves has a safety valve closure member adapted to be automatically opened to interconnect the two lines of the trailer brake system upon breakaway of the trailer from the tractor vehicle.

Thus, the present invention provides a safety device for a hydraulic brake system of a trailer vehicle fitted with hydraulic brake actuators and with a dual-purpose accumulator adapted to store hydraulic fluid under pressure and to release a spring to mechanically apply the trailer brakes in the event of a loss of hydraulic pressure, said safety device being associated with a twin-line coupling of which at least the trailer-mounted coupling heads are each provided with a closure member adapted to seal the head when it becomes detached from its mating tractor mounted coupling head and comprising a valve closure member with which a member on the tractor vehicle cooperates for interconnecting the accumulator and brake lines on the trailer vehicle in the event of trailer breakaway.

Preferably, the trailer-mounted coupling heads are fitted to a housing of the safety device and are connected to accumulator and brake line passages through said housing, and the tractor-mounted coupling heads are fitted to said member on the tractor vehicle.

Advantageously, the valve closure member of the safety device is hydrostatically balanced.

In a preferred embodiment, the safety valve closure member is spring-biased towards its open position and is automatically held in its closed position by the tractor vehicle when the coupling heads on the tractor and trailer vehicles are coupled together.

In another embodiment, the safety valve closure member is attached to the tractor vehicle by a shear member which pulls the safety valve closure member to its open position upon separation of the coupling heads with trailer breakaway and shears only after the closure member has been moved to its open position.

Figure 3:
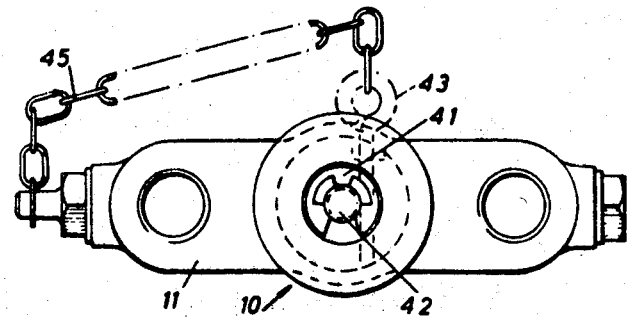
Figure 4:
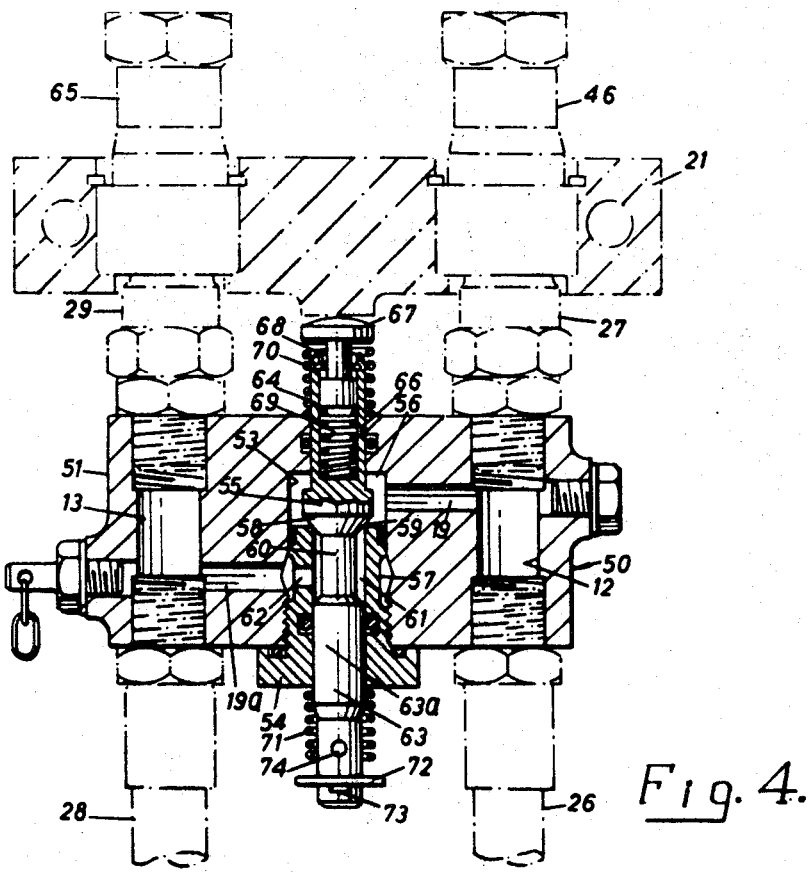
Figure 5:
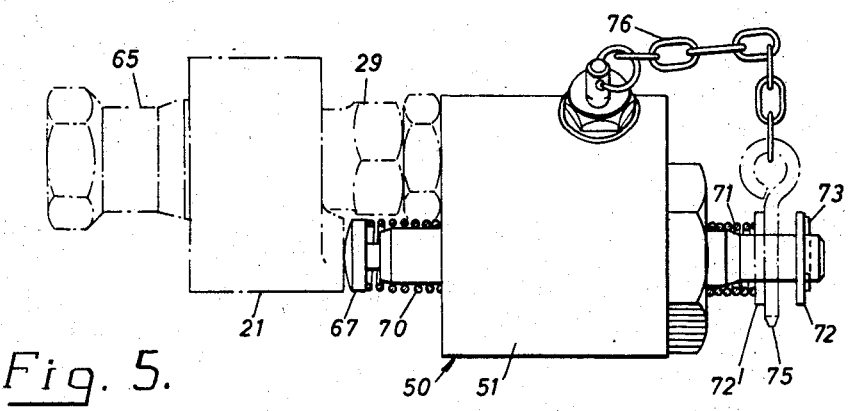
Figure 6:
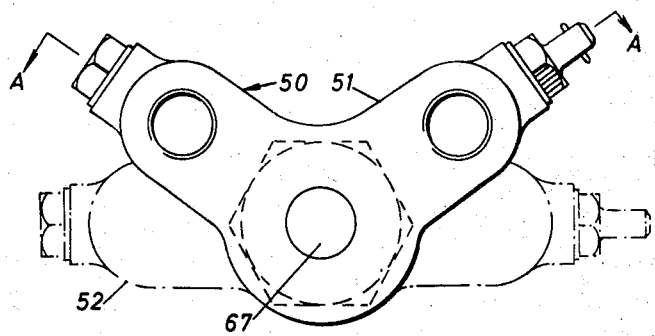
Figure 8:
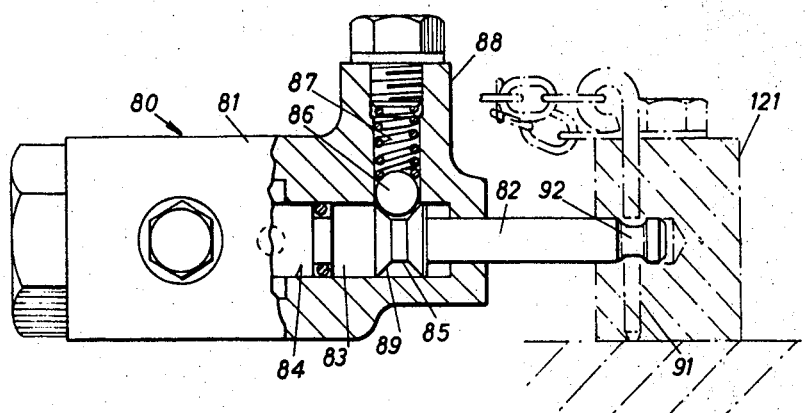
Figure 9:
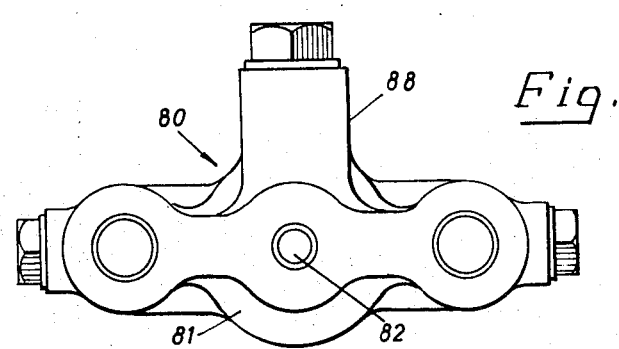
Figure 10:
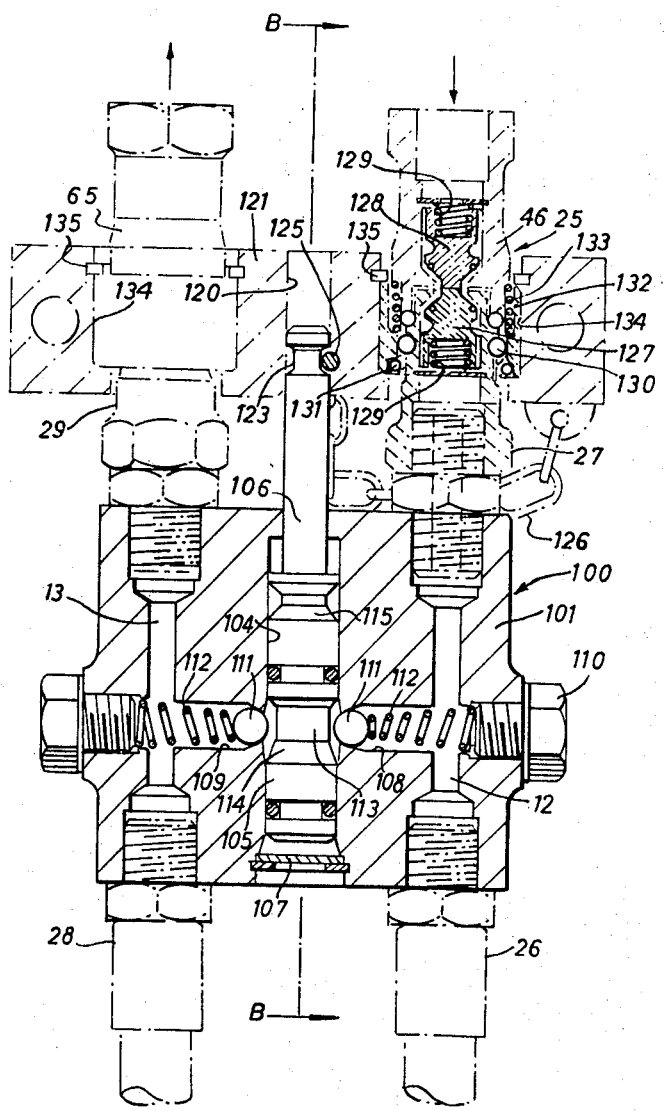
Figure 12:
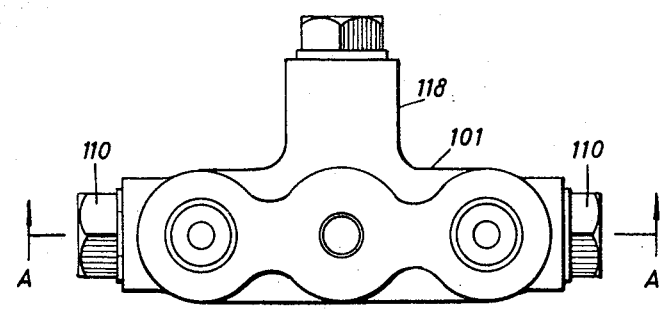
Figure 11:
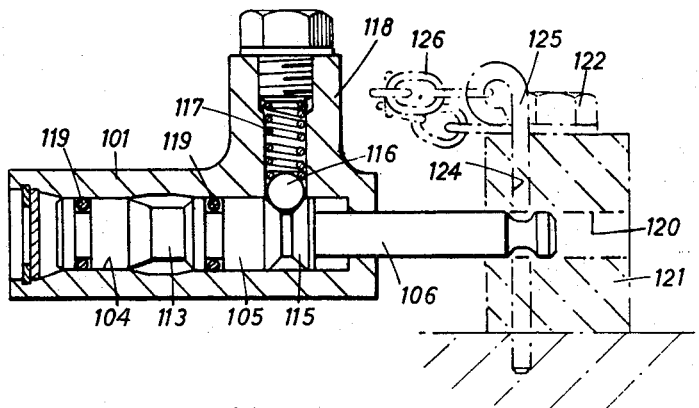

The invention is further described, by way of example, with reference to the accompanying drawings, in which:

FIG. 1 is a sectional plan view of a first embodiment of safety valve arrangement constructed in acordance with the invention, FIG. 2 is a side elevation of the valve arrangement of FIG. 1, FIG. 3 is an end view of the valve arrangement, FIG. 4 is a sectional view on the line A—A of FIG. 6 of a second embodiment of safety valve arrangement, FIGS. 5 and 6 are side and end views respectively of the valve arrangement of FIG. 4, FIGS. 7, 8 and 9 are views similar to FIGS. 1, 2 and 3 respectively, but showing a third embodiment of safety valve arrangement, and FIGS. 10, 11 and 12 are views similar to FIGS. 4, 5 and 6, respectively, but showing a fourth embodiment of safety valve arrangement, FIG. 11 being a section on the line B—B of FIG. 10.

The safety valve arrangements shown in the drawings are for use with a trailer hydraulic brake system having a line 26 leading to a pressure accumulator fitted to a trailer vehicle and a line 28 leading to hydraulic brake actuators of the trailer vehicle. The trailer braking system includes a twin-line quick-release self-sealing breakaway coupling 25. The twin-line coupling 25 includes coupling heads 27 and 29 (fitted to the housing 11 of the safety valve arrangement 10 in FIG. 1) and coupling heads 46 and 65 fitted in a block 21 secured to the tractor vehicle.

The trailer coupling head 27 is connected by a bore 12 in the housing 11 to the accumulator line 26 whilst the coupling head 29 is connected by a bore 13 in the housing 11 to the brake line 28. The tractor coupling head 46 which cooperates with the head 27 is connected through an unloader valve (not shown) to a hydraulic pump mounted on the tractor vehicle. The pump serves for charging the trailer accumulator through the line 26 and the unloader valve is adapted to unload the pump when the trailer accumulator pressure reaches a predetermined value whilst holding the pressure in the accumulator. The tractor coupling head 65 which cooperates with the head 29 is connected to a brake relay or metering valve (not shown) which is adapted to apply pressure to the trailer brake actuators through the line 28 when the tractor brakes are actuated.

These features are described more fully in our copending patent applications Nos. 795,103 and 795,104 filed concurrently herewith.

Each of the coupling heads 27, 29, 46 and 65 is self-closing in that it contains a valve closure member which automatically closes to seal the line to which that coupling head is connected when the coupling heads are detached from one another.

The housing 11 of the safety valve arrangement 10 shown in FIGS. 1, 2 and 3 has a central longitudinal bore 14 extending parallel to and located between the bores 12 and 13. A sleeve 15 is slidably received in the bore 14 and is biased forwardly by a spring 16 held in position by a plug 17 closing the rear end of the bore 14. The forward end of the bore 14 defines a valve chamber 18 connected by a transverse passage 19 to the bore 12 associated with the accumulator line 26. The sleeve 15 has an external annular groove 20 which is always in communication with a transverse passage 19a leading to the bore 13 associated with the brake line 28. A valve closure member 22 is located in the chamber 18 and is slidably guided in the sleeve 15. The member 22 has a conical valve surface 23 which cooperates with a valve seat 24 formed on the forward end of the sleeve 15. The valve closure member 23 has a reduced diameter portion 30 to define an annular passage 31 within the sleeve 15 and communicating by a radial bore 32 in the sleeve with the external annular groove 20 and thereby with the bore 13. The rear end of the annular passage 31 is closed by a land 33 on the valve closure member 22 and sealingly guided within the sleeve 15.

The valve closure member 22 has a valve stem 34 which extends through a reduced diameter portion 35 of the bore 14 and out of the housing 11. The land 33, the valve seat 24 and the valve stem 34 are all of the same diameter so that the valve closure member 22 is hydrostatically balanced. A spring 36 fitted between a boss 37 on the housing 11 and a washer 38 on the protruding end of the valve stem 34 biases the valve closure member 22 towards its open position. The washer 38 together with one end 39 of a protective bellows for the spring 36 and a bellows retaining washer 40 are held in position on the valve stem by a circlip 41. The protective bellows 39 are fitted on the boss 37. The extreme end 42 of the valve stem 34 is so disposed as to be engaged by the block 21 mounted on the tractor vehicle so that this block urges the valve closure member 22 against the sleeve 15 to close the valve when the trailer coupling heads 27 and 29 are fitted to the tractor coupling heads 46 and 65, the spring 16 being sufficiently strong to hold the valve closed against the accumulator pressure prevailing in the chamber 18.

Whenever the trailer coupling heads are separated from the tractor coupling heads, particularly in the event of a trailer breakaway, the spring 36 automatically moves the valve closure member 22 to its open position and at the same time the self-closing valves in the trailer coupling heads 27, 29 close to prevent any loss of pressure from the lines 26, 28. The opening of the valve closure member 22 connects the accumulator line 26 to the trailer brake line 28 to automatically apply the trailer brakes.

It will be noted that the trailer brakes will be applied in the same way when the tractor is unhitched from the trailer in the normal manner. In certain circumstances this may be undesirable, e.g. if it is desired to move the trailer when separated from the tractor. To deliberately prevent the safety valve from automatically opening, a transverse pin 43 can be inserted in a suitable bore in the housing 11 so as to engage in a recess 44 in the valve stem 34 and so prevent the spring 36 from opening the valve. The pin 43 is attached to the housing 11 by a chain 45 to prevent the pin 43 from being lost.

The plug 17 has small bore 47 to prevent build up of pressure in the rear end of the bore 14.

The operation of the safety valve arrangement shown in FIGS. 4, 5 and 6 is generally similar to that of FIGS. 1, 2 and 3. However, the housing 51 of the valve arrangement 50 of FIG. 4 is of V-shape as can be seen in FIG. 6. Thus the housing 51 has a central longitudinal bore 53 which is somewhat lower than the bores 12 and 13 communicating respectively with the accumulator and brake lines 26 and 28. Alternatively it may be of flat shape as indicated by the chain dotted lines 52 in FIG. 6. A bush 54 is screwed into the rear end of the bore 53 and slidably receives a valve closure member 55. The forward end of the bore 53 defines a valve chamber 56 connected by the transverse passage 19 to the bore 12 and the bush 54 has a peripheral groove 57 connected by the transverse passage 19a to the bore 13.

The valve closure member 55 has a conical valve surface 58 which cooperates with a seat 59 formed on the forward end of the bush 54. A reduced diameter portion 60 of the valve closure member defines an annular passage 61 connected by a radial bore 62 in the bush 54 to the annular groove 57 and thereby to the bore 13. A land 63a on a rearward stem 63 of the valve closure member 55 is sealed to the bore 54 to close the rear end of the annular passage 61 and a forward hollow stem 64 is sealingly guided in a reduced diameter portion 66 of the bore 53 and extends out of the housing 51. The land 63a the valve seat 59 and the valve stem 64 are all of the same diameter so that the valve closure member 55 is hydrostatically balanced.

A valve actuating button 67 is held captive on the hollow valve stem 64 by means of a spring ring 68 received within the stem 64. The button 67 acts on the closure member 55 through a spring 69 received within the hollow stem 64 whilst a spring 70 acting between the housing 51 and the button 67 biases the closure member 55 towards its open position. When the trailer coupling heads 27 and 29 are fitted to the tractor coupling heads 46 and 65, the block 21 engages the button 67 to urge the valve closure member 55 against its seat 59 vie the spring 69 to hold the valve closed. In the event of a trailed breakaway the block 21 releases the button 67 so that the spring 70 automatically opens the valve to apply the trailer brakes as in the preceding embodiment.

So that the valve can be deliberately held closed when the tractor is unhitched from the trailer, a comparatively strong spring 71 is fitted about the rearward valve stem 63 and is retained thereon by a washer 72 and a split pin 73. The spring 71 is so short that it does not interfere with normal operation of the valve. However, the valve stem 63 has a transverse bore 74 in which a pin 75 can be inserted after the washer 72 has been pressed forwardly to its position 72' (shown in FIG. 5) in which the spring 71 is compressed. The spring 71 is made stronger than the spring 70 so that it now holds the valve closure member 55 in its closed position when the coupling heads 27, 29 are separated from the coupling heads 46 and 65. The pin 75 is attached by a chain 76 to the housing 51.

Figure 7:
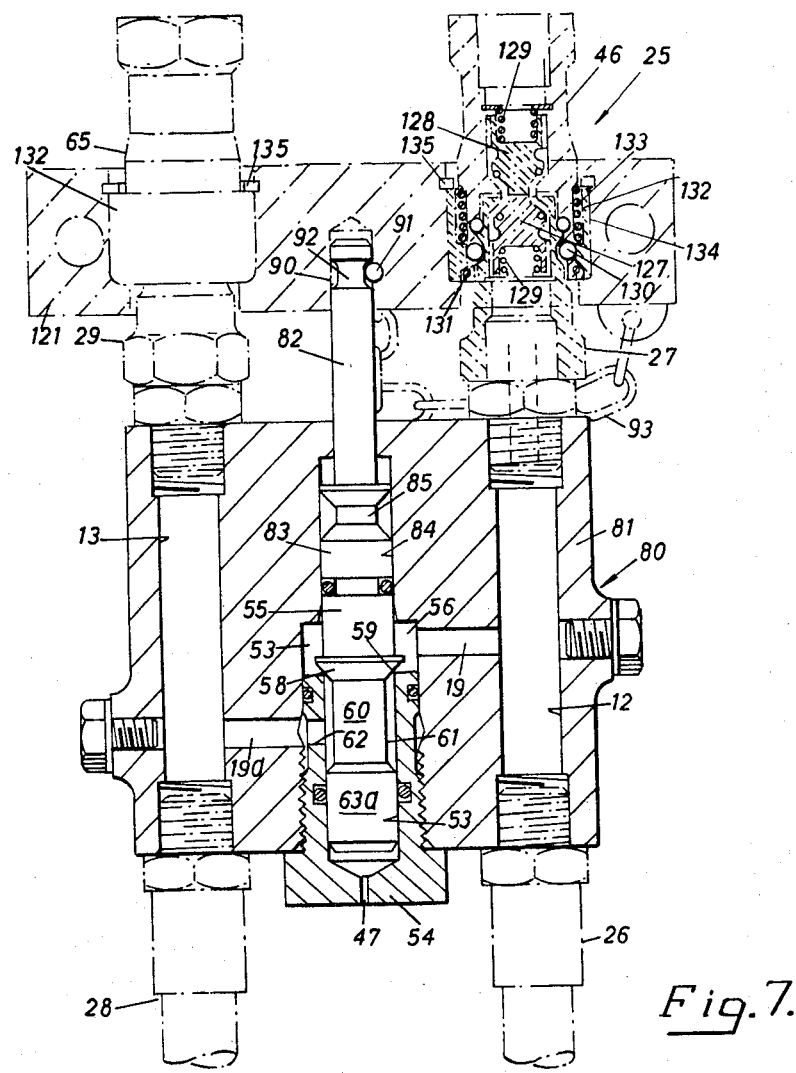

The safety valve arrangement 80 shown in FIGS. 7 to 9 is in many respects similar to that of FIGS. 4 to 6 and like parts are denoted by the same reference numerals. In the arrangement 80 of FIGS. 7 to 9 however, the hydrostatically balanced valve closure member 55 does not have a rearward stem but only a forward stem 82, 83 with a reduced diameter portion 82 extending out of the housing 81. A narrow bore 47 in the bush 54 prevents pressure build-up in the rear end of the bore 53. The forward stem has a main portion 83 sealed to a smaller diameter portion 84 of the bore 53 and having a detent groove 85 with sloping side walls. A detent ball 86 is biased into the groove 85 by a spring 87 housed in a boss 88 of the housing 81. The ball 86 engages the sloping side wall 89 of the detent groove 85 and urges the valve closure member into its closed position against the valve seat 59 on the bush 54. The forward end of the stem portion 82 is received in a central bore 90 in the block 121 receiving the tractor coupling heads 46 and 65. When the coupling heads 27 and 29 are fitted to the coupling heads 46 and 65, a shear pin 91 is inserted in the block 121 and engages in an annular groove 92 in the end of the stem portion 82. A chain 93 attaches the shear pin to the block 121 to prevent the pin from being lost.

In the event of trailer breakaway, the coupling heads become detached whilst the shear pin 91 pulls on the stem 82 thereby opening the valve closure member 55 against the effect of the detent 85, 86, causing the ball 86 to ride on the stem portion 83. Finally the pin 91 shears when the trailer becomes completely detached from the tractor.

When the trailer is unhitched from the tractor vehicle in the normal manner, the pin 91 is first removed so that the trailer brakes are not applied upon separation of the coupling heads. The trailer brakes can however be applied by pulling the stem portion 82.

FIG. 7 shows the construction of one of the quick release couplings. Each of the coupling heads is provided with a self-closing valve whose movable valve closure member 127, 128 is held open by abutment with the valve member 128, 127 in the complementary head when the heads 27 and 29 are fitted to their correspondisg heads 46 and 65 and is automatically closed by springs 129 when the coupling heads are pulled apart. The head 27 is plugged into the head 46 and is retained therein by balls 130 which are received in radial bores in the head 46 and engage in an annular groove in the head 27. The balls 130 are normally prevented from radial outward displacement by an axially displaceable sleeve 132 held captive on the head 46 by a circlip 131. A spring 133 biases the sleeve 132 towards its resting position against the circlip 131. To release the coupling, the sleeve 132 is pushed back along the head 46 to release the balls 130 whereupon the head 27 can be unplugged from the head 46. The coupling heads 29 and 65 are constructed in an identical manner. The sleeves 132 of both the heads 46 and 65 are secured in bores 134 of the block 121 by circlips 135.

Should the trailer break away from the tractor vehicle, the coupling heads 27, 29 pull on the heads 46 and 64 respectively, thereby compressing the springs 133 so that the balls 130 are released and the coupling heads can be separated. When the heads are separated, the valve springs 129 urge the valve closure members 127, 128 against their seats to close for the coupling heads.

The operation of the safety valve arrangement 100 of FIGS. 10 to 12 is similar to the arrangement 80 of FIGS. 7 to 9 and like parts are denoted by like reference numerals. This valve arrangement 100 has a housing 101 containing the passages 12 and 13 which connect the lines 26 and 28 to the coupling heads 27 and 29 respectively. The housing 101 also has a medial longitudinal bore 104 in which a plunger 105 is slideable. A rod 106 on the plnuger 105 extends from the forward end of the housing 101 and the rearward end of the bore 105 is closed by a disc 107. Transverse bores 108 and 109 intersect the passages 12 and 13 and are closed at the outside of the housing by blanking screws 110. The inner ends of the transverse bores 108 and 109 are tapered to provide valve seats for balls 111 biased against these seats by springs 112. The tapered inner ends of the bores 109 break into the longitudinal bore 104 and the balls 111 protrude into this bore when they are seated by the springs 112 as shown. The plunger 105 has an annular groove 113 normally registering with the balls 111 to permit them to seat. One flank of this groove 113 is provided by a conical surface 114 so that when the plunger 105 is moved forwardly by means yet to be described the conical surface 114 engages the balls 111 to unseat them and place the passages 12 and 13 in communication with one another through the bores 108 and 109 and the annular groove 113. Sealing rings 119 (FIG. 11) are preferably provided at opposite sides of the annular groove 113 for sealing the plunger 105 to the bore 104.

The plunger 105 has a second annular groove 115 serving as a detent groove as shown more clearly in FIG. 11. A detent ball 116 is biased by a spring 117 housing in a boss 118 on the housing 101. A firm pull on the rod 106 disengages the ball 116 from the groove 115 and enables the plunger 105 to move to the right to open the ball valves 111.

The free end of the rod 106 enters a bore 120 in a block 121 attached to the tractor vehicle by bolts 122 and has an annular groove 123 which normally registers with a transverse bore 124 in the block 121. A pin 125, attached to the tractor vehicle by a chain 126 to prevent the pin from being lost, is inserted in the transverse bore 124 and engages in the annular groove 123 and thereby releasably attaches the plunger 105 to the tractor vehicle.

Should the trailer break away from the tractor vehicle, the coupling heads 27 and 29 are separated from the heads 46 and 65 respectively and the valve springs 129 urges the valve closure members 127 and 128 against their seats in the coupling heads to close off the coupling heads. At the same time the tractor pulls on the rod 106 against the force of the detent 116, 117 and the plunger 105 opens the ball valves 111 to connect the accumulator line 26 to the brake line 28. The hydraulic accumulator thereby automatically operates the trailer brake actuators in the event of a trailer break away. Finally the pin 125 shears to permit complete withdrawal of the plunger stem 106 from the block 121.

We claim:
1. For a hydraulic brake system of a trailer vehicle adapted to be hitched to a tractor vehicle and fitted with a hydraulic accumulator and with hydraulic brake actuators: the combination comprising a twin-line coupling having mating tractor-mounted and trailer-mounted coupling heads, at least each of said trailer-mounted coupling heads having a closure member adapted to automatically seal the respective head when the latter becomes detached from the corresponding tractor-mounted head; a safety device having a housing with accumulator and brake line passages therein connected respectively to said trailer-mounted coupling heads and a safety valve closure member movable in said housing from a closed position to an open position in which said accumulator and brake line passages are interconnected; and means including a member on said tractor vehicle cooperating with said valve closure member for automatically moving said safety valve closure member to its open position in the event that the trailer vehicle unitentionally becomes unhitched from the tractor vehicle.

2. A device according to claim 1 in which said housing has accumulator and brake line passages therethrough connectible respectively to the accumulator and the hydraulic brake actuator and in which trailer-mounted coupling heads are fitted to the housing of the safety device and are connected to said accumulator and brake line passages and the tractor mounted coupling heads are fitted to said member on the tractor vehicle.

3. A device according to claim 2 in which said housing contains transverse bores which respectively intersect the accumulator and brake line passages and in which the safety valve closure member serves to interconnect said transverse bores.

4. A device according to claim 1 in which said mating coupling heads can be readily pushed together and pulled apart in an axial direction, and in which said housing has a longitudinal bore extending in said axial direction said safety valve closure member being axially slidable in said longitudinal bore.

5. A device according to claim 1 in which said valve closure member of the safety device is hydrostatically balanced.

6. A device according to claim 1 in which said means for moving said valve closure member of the safety device towards said open position includes a spring, said safety valve closure member being held in its closed position by abutment with said member on the tractor vehicle when the coupling heads are coupled together.

7. A device according to claim 6 which further comprises a pin member which may be optionally engaged with said safety valve closure member to hold said closure member in said closed position even when the coupling heads are detached.

8. A device according to claim 1 in which said housing has a valve seat therein and said safety valve closure member has a valve surface cooperable with said valve seat and a forward valve stem which is sealed to and extends out of said housing for cooperation with said member on the tractor vehicle.

9. A device according to claim 8 in which said safety valve closure member also has a rearward stem which has a land sealingly guided in said housing.

10. A device according to claim 8 in which said housing has a bush which is axially slidable in the housing, said bush having said valve seat thereon, and in which a second spring is arranged between said bush and said housing, urging said bush towards said safety valve closure member.

11. A device according to claim 8 further comprising a second spring arranged to act between said member on the tractor vehicle and said forward valve stem.

12. A device according to claim 11 which further comprises a button and means holding said button captive on said forward valve stem and in which said means for moving said safety valve closure member towards its open position comprises a first spring arranged between the housing and the captive button, said second spring being arranged between said button and said forward valve stem.

13. A device according to claim 8 in which said forward valve stem has a portion projecting from the housing and in which a shear member releasably attach said projecting valve stem portion to said member on the tractor vehicle.

14. A device according to claim 8 which includes a detent groove in said valve stem, said detent groove having a sloping wall, and a detent member engaging said sloping wall to releasably urge said valve surface against said valve seat.

15. A device according to claim 3 which includes a respective safety valve closure member cooperable with a seat in each of said transverse bores and a plunger having a sloping surface for simultaneously lifting said safety valve closure members from their seats.

16. A device according to claim 15 in which said coupling heads can be readily pushed together and pulled apart in an axial direction, and in which said plunger is slidable in said axial direction in said housing.

17. A device according to claim 16 in which said plunger has an extension rod thereon projecting from said housing and in which a shear member releasably attaches said rod to said member on the tractor vehicle.

References Cited

FOREIGN PATENTS

| | | |
|---|---|---|
| 97,205 | 10/1939 | Sweden. |
| 98,071 | 2/1940 | Sweden. |
| 705,773 | 5/1941 | Germany. |

MILTON BUCHLER, Primary Examiner

J. J. McLAUGHLIN, JR., Assistant Examiner

U.S. Cl. X.R.

188—3, 112; 280—421; 303—7, 49, 84